United States Patent
Naito et al.

(10) Patent No.: US 9,028,781 B2
(45) Date of Patent: May 12, 2015

(54) RENEWABLE ENERGY STORAGE SYSTEM

(75) Inventors: Hiroto Naito, Hitachi (JP); Masatoshi Sugimasa, Tokai (JP); Takao Ishikawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 13/991,230

(22) PCT Filed: Dec. 3, 2010

(86) PCT No.: PCT/JP2010/071745
§ 371 (c)(1),
(2), (4) Date: Jun. 3, 2013

(87) PCT Pub. No.: WO2012/073383
PCT Pub. Date: Jun. 7, 2012

(65) Prior Publication Data
US 2014/0079593 A1    Mar. 20, 2014

(51) Int. Cl.
*H02J 15/00* (2006.01)
*B01J 19/00* (2006.01)
*B01J 19/08* (2006.01)
*C25B 1/04* (2006.01)

(52) U.S. Cl.
CPC ............... *H02J 15/00* (2013.01); *Y02E 70/30* (2013.01); *C25B 1/04* (2013.01); *Y02E 70/10* (2013.01); *Y02E 60/366* (2013.01); *B01J 19/0046* (2013.01); *B01J 19/087* (2013.01)

(58) Field of Classification Search
None
See application file for complete search history.

(56) References Cited

U.S. PATENT DOCUMENTS

| | | | |
|---|---|---|---|
| 6,685,821 B2 * | 2/2004 | Kosek et al. | 205/637 |
| 7,199,482 B2 | 4/2007 | Hopewell | |
| 2009/0020418 A1 | 1/2009 | Sugai et al. | |
| 2009/0115190 A1 * | 5/2009 | Devine | 290/44 |
| 2012/0091730 A1 | 4/2012 | Stuermer et al. | |

FOREIGN PATENT DOCUMENTS

| | | |
|---|---|---|
| DE | 102009018126 A1 | 10/2010 |
| EP | 1739824 A2 | 1/2007 |
| EP | 1878714 A1 | 1/2008 |
| JP | 07-192746 A | 7/1995 |
| JP | 2000-282277 A | 10/2000 |
| JP | 2002-180281 A | 6/2002 |
| JP | 2004-316662 A | 11/2004 |
| JP | 2004-320823 A | 11/2004 |
| JP | 2007-249341 A | 9/2007 |
| JP | 2009-077457 A | 4/2009 |
| WO | 2006/120841 A1 | 11/2006 |
| WO | 2009/019159 A2 | 2/2009 |

* cited by examiner

Primary Examiner — Lessanework Seifu
(74) Attorney, Agent, or Firm — Volpe and Koenig, P.C.

(57) ABSTRACT

A renewable energy storage system that stores renewable energy, includes: an electrical power generator that converts renewable energy into electrical power; an electrical storage device that stores the electrical power; a hydrogen production device that produces hydrogen using the electrical power from the electrical power generator and/or the electrical power stored in the electrical storage device; a hydrogenation device that adds the hydrogen produced by the hydrogen production device to the unsaturated hydrocarbon; a saturated hydrocarbon storage device that stores the saturated hydrocarbon produced by the addition of the hydrogen to the unsaturated hydrocarbon; an unsaturated hydrocarbon storage device that stores the unsaturated hydrocarbon; and an unsaturated hydrocarbon supply controller that controls the supply of unsaturated hydrocarbon stored in the unsaturated hydrocarbon storage device to the hydrogenation device.

9 Claims, 9 Drawing Sheets

RENEWABLE ENERGY STORAGE SYSTEM

TECHNICAL FIELD

The present invention relates to a renewable energy storage system.

BACKGROUND ART

As massive consumption of fossil fuels has been continuing, global warming, air pollution in urban areas, and the like caused by carbon dioxide, have become serious. In this situation, attention is focused on hydrogen as an energy source that will take a measure role in the next generation to take the place of fossil fuels. Hydrogen can be electrolytically produced, utilizing renewable energy represented by photovoltaic battery, wind power, or the like for example. Further, only water is produced by burning hydrogen. Accordingly, hydrogen is a clean energy source with little emission of environmental pollutant through producing and using.

As a method of producing hydrogen, steam-reforming of fossil is industrially and widely applied. Further, there are known other various producing methods including reaction using by-product hydrogen in producing iron or soda, thermal decomposition, photocatalyst, microorganisms, or electrolysis of water. Particularly, it is possible to use electrical powers from various kinds of supply sources as a power necessary for electrolysis of water. Accordingly, the importance of methods of producing hydrogen by electrolysis of water is emphasized as methods of producing an energy source without depending on a certain area.

However, in using hydrogen as an energy source (namely fuel), transportation, storage, a supply system or the like can be significant problems. Concretely, as hydrogen is in a gas state at an ordinary temperature and pressure, storage and transportation of hydrogen are more difficult problems than those of liquid and solid. Further, hydrogen is a flammable material and possibly reacts explosively when air and hydrogen are mixed at a certain mixture ratio.

As a technology to solve these problems, for example, Patent Document 1 discloses a fuel cell electrical power generator system wherein hydrocarbon fuel is subjected to desulfurization by a desulfurization device; water vapor is thereafter added to the hydrocarbon fuel; the hydrocarbon fuel is supplied to a steam reforming unit; hydrogen is generated here; this hydrogen is supplied to a fuel cell; and the hydrogen is subjected to reaction with oxygen so that electrical energy is taken out.

Further, recently, as hydrogen storage methods excellent in safeness, transportability, and storage capacity, attention is focused on organic hydride systems using hydrocarbon, for example, cyclohexane, decalin, etc. Being liquid at an ordinary temperature and pressure, these hydrocarbons are easier to store and transport than a case of gas. For example, benzene and cyclohexane are cyclic hydrocarbons with the same carbon number, wherein benzene is an unsaturated hydrocarbon with double bond, while cyclohexane is a saturated hydrocarbon without double bond. That is, cyclohexane, which is a saturated hydrocarbon, is obtained by hydrogenating benzene, which is an unsaturated hydrocarbon. Also, benzene is obtained by desorbing hydrogen from cyclohexane. For example, Patent Document 2 discloses a system capable of storing and supplying hydrogen by utilizing hydrogenation reaction and hydrogen desorption reaction by the use of benzene and cyclohexane in such a manner.

However, in order to build an organic hydride system using renewable energy, there are cases that it is necessary to consider the electric energy (namely electrical power generation amount) by the renewable energy into account. In other words, the electrical power generation capacity by renewable energy ordinarily varies with weather conditions. For example, an electrical power generation capacity varies with the strength/weakness of wind in a case of wind power generation using wind power as a renewable energy, and varies with the strength/weakness of sunshine and hours of sunshine in a case of photovoltaic power generation using solar light.

In order to respond to such variation in the electric energy, for example, Patent Document 3 discloses a wind-power-generation hydrogen production device that includes a wind power generator device for supplying electrical power to a load and an electrolytic hydrogen production device that is supplied with electrical power from the wind power generator device, wherein, with a preset electrical power to be supplied to the load as a target value, the difference between the electrical power output from the wind power generator device and the target value is supplied to the electrolytic hydrogen production device.

Further, Patent Document 4 discloses a hydrogen using system provided with a controller that controls operation of a water electrolysis device, corresponding to the cost of commercial electrical power, the hydrogen consumption amount of a hydrogen using device, and the hydrogen storage amount by hydrogen storing means.

BACKGROUND ART DOCUMENT

Patent Document

Patent Document 1: JP H7-192746 A
Patent Document 2: WO 2006/120841 pamphlet
Patent Document 3: JP 2007-249341 A
Patent Document 4: JP 2002-180281 A

DISCLOSURE OF THE INVENTION

Problems to be Solved by the Invention

For example, in a case of directly storing (namely charging) an electric power obtained by wind power generation, photovoltaic power generation, or the like in a storage battery, in order to store an electric power obtained through a long time, it may be necessary to use a storage battery with a capacity enabling storage of a large amount of electrical power. Consequently, it is possible that the size of a storage battery becomes extremely large or the manufacturing cost of the storage battery increases. Further, in a case of transporting an electrical power stored in a storage battery, it may be necessary to transport an extremely large sized storage battery, and thereby transportation possibly becomes painstaking.

Further, some conventional art may require a device dedicated to control of charging and discharging of a storage battery or a high equipment cost. Still further, as described above, as a renewable energy amount varies with the strength/weakness of sunshine and hours of sunshine in a case of photovoltaic power generation, it is also possible that a loss of the renewable energy is caused, and the renewable energy cannot be effectively used.

The present invention has been developed to solve the above-described problems, and an object of the invention is to provide a renewable energy storage system arranged such as to be able to store and supply renewable energy with a high efficiency while taking variation in the renewable energy amount into account.

Means for Solving the Problems

As a result of intensive discussion to solve the above-described problems, the inventors have found that the above-described problems can be solved by appropriately controlling the amount of unsaturated hydrocarbon in hydrogenating the unsaturated hydrocarbon.

Advantage of the Invention

According to the present invention, it is possible to provide a renewable energy storage system arranged such as to be able to store and supply renewable energy with a high efficiency while considering variation in the renewable energy amount into account.

EMBODIMENTS FOR CARRYING OUT THE INVENTION

Referring to the drawings, as appropriate, renewable energy storage systems will be described below according to six embodiments.

1. First Embodiment

<Configuration>

Figure 1:
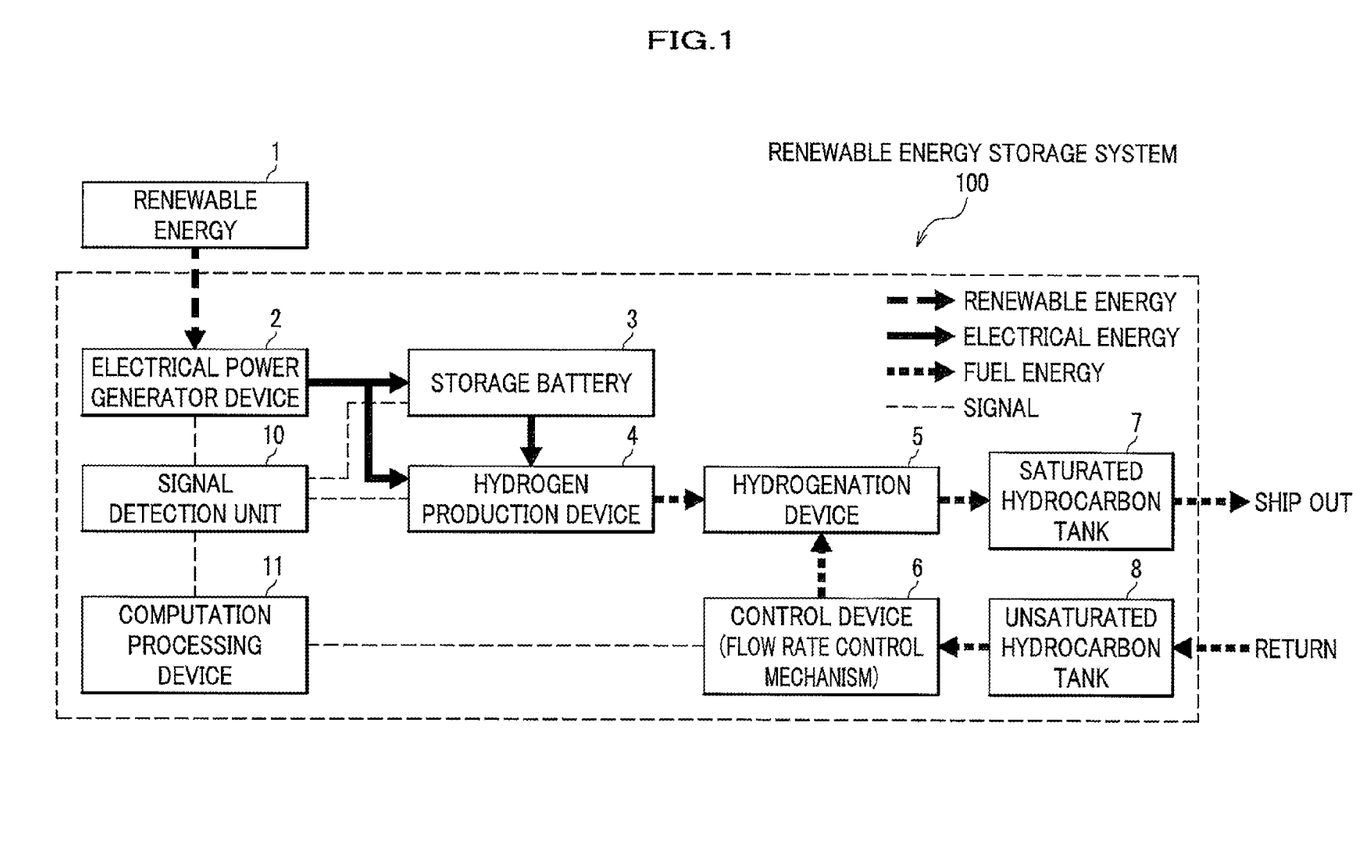
FIG. 1 schematically shows a configuration of a renewable energy storage system according to a first embodiment of the invention.

FIG. 1 schematically shows the configuration of a renewable energy storage system according to a first embodiment of the invention. In FIG. 1, the long-dashed arrows represent the direction of a renewable energy (for example, solar light, wind power, etc.), the solid arrows represent the direction of an electrical energy (electrical power), the short-dashed arrows represent the direction of a fuel energy (for example, hydrogen, methylbenzene, etc.), and the dashed lines represent wiring for connecting respective means to each other and for supplying and receiving of signals.

As shown in FIG. 1, a renewable energy storage system 100 according to the first embodiment stores a renewable energy 1. The renewable energy storage system 100 includes at least an electrical power generator device 2 as electrical power generating means, a storage battery 3 as electrical energy storing means, a hydrogen production device 4 as hydrogen producing means, a hydrogenation device 5 as hydrogenating means, a saturated hydrocarbon tank 7 as saturated hydrocarbon storing means, an unsaturated hydrocarbon tank 8 as unsaturated hydrocarbon storing means, and a control device 6 as unsaturated hydrocarbon supply amount control means (flow rate control mechanism).

Further, the renewable energy storage system 100, shown in FIG. 1, according to the first embodiment includes a signal detection unit 10 and a computation processing device 11.

The renewable energy storage system 100 configured as described above is applied to the renewable energy 1.

The renewable energy 1 represents a renewable energy, for example, solar light, wind power, geothermal power, water power, etc. There are provided no electrical or physical connection lines, pipes, or the like between the renewable energy 1 and the electrical power generator device 2, and the renewable energy 1 is based on earth weather conditions. Concretely, in a case that the renewable energy 1 refers to solar light for example, the later-described electrical power generator device 2 is, for example, a photovoltaic battery, a photovoltaic power generation system, or the like.

The electrical power generator device 2 converts the renewable energy 1 such as solar light, and wind power into electric power. The electrical power generator device 2 is electrically connected with the storage battery 3 and the hydrogen production device 4 so that an electrical power generated by the electrical power generator device 2 can be supplied to the storage battery 3 and the hydrogen production device 4. Further, the electrical power generator device 2 is connected with the signal detection unit 10 by an electrical signal line.

Still further, though not shown in FIG. 1, the electrical power generator device 2 is provided with electrical power control means for controlling an output electrical power in outputting the electrical power generated by itself. The electrical power control means adjusts electrical power supply amounts to the storage battery 3 and hydrogen production device 4.

The storage battery 3 stores an electric power generated by the electrical power generator device 2. The storage battery 3 is electrically connected with the electrical power generator device 2 and the hydrogen production device 4 to be able to supply the electric power stored in the storage battery 3 to the hydrogen production device 4, as necessary. Further, the storage battery 3 is connected with the signal detection unit 10 by an electrical signal line.

Concrete configuration of the storage battery 3 is not particularly limited, and a known storage battery (secondary battery) can be adopted. Herein, the storage battery 3 is desirably a cyclic storage battery that is manufactured such as to be dedicated to repeat use in which electrical discharging is performed from a fully charged state and charging is performed again after certain discharging. Concretely, as the storage battery 3 can be, for example, a sodium-sulfur battery, a lead storage battery, or the like, and a lead storage battery is particularly preferable because a lead storage battery is excellent in the electrical performance, compact, and inexpensive. Incidentally, the storage battery 3 may be configured as a single storage battery, and may be configured as a group of storage batteries by arbitrarily connecting two or more storage batteries.

The hydrogen production device 4 produces hydrogen, using an electrical power obtained by the electrical power generator device 2 and/or an electrical power stored in the storage battery 3. Concretely, in the hydrogen production device 4, at least hydrogen is generated by electrolysis of water (or aqueous solution), using these electrical powers. Accordingly, the more the electrical power supplied to the hydrogen production device 4 from the electrical power generator device 2 and/or the storage battery 3, the larger the amount of hydrogen produced (generated) by the hydrogen production device 4. The hydrogen production device 4 is electrically connected with the electrical power generator device 2 and the storage battery 3, connected with the hydrogenation device 5 by a gas pipe, and connected with the signal detection unit 10 by an electrical signal line.

Although concrete configuration of the hydrogen production device 4 is not particularly limited, the hydrogen production device 4 includes, for example, water, electrolyte, electrode catalysts provided such as to sandwich the electrolyte to promote reaction, and an electrolysis cell holding an electricity collector and the like for supplying an external electric power. These electrode catalysts electrolyze water, and hydrogen and oxygen are thereby generated.

The above-described electrolyte is not particularly limited as long as at least hydrogen is generated by electrolysis, however, a compound, such as potassium hydroxide, that shows alkalinity when dissolved in water is preferable. By using such a compound, a hydrogen production device 4 which is inexpensive and resistance to corrosion can be provided. As the electrolyte, it is also possible to use solid polymer electrolyte, for example, Nafion (registered trademark).

Any hydrogen production device 4 configured as described above can be operated at a low temperature lower than or equal to 100 degrees centigrade, and has an advantage allowing start up in a short time.

Conditions of electrolysis of water are not particularly limited, and arbitrary setting is allowed as long as hydrogen can be generated. However, from the point of view of reducing evaporation of water, the pressure during the electrolysis (i.e., during production of hydrogen) is preferably set to be within a range of gauge pressure from 1 atm to 50 atm (in other words, from 1 MPa to 5 MPa). By such settings, a device for applying a high pressure in storing the generated hydrogen is unnecessary, and an advantage of low cost is obtained. Further, the reaction efficiency can be improved. As a method of increasing the pressure of generated hydrogen, for example, there may be a method of injecting an inactive gas, for example nitrogen, helium, etc., into the hydrogen production device 4, and a method of sealing in a gas generated by electrolysis until the pressure reaches a certain pressure, or the like. Further, as a method of controlling the pressure, for example, a pressure regulator may be used, or a known compressor may be used.

From a point of view of reducing the excess voltage and increasing the energy efficiency, electrolysis is preferably performed at a temperature in a range from 100 to 200 degrees centigrade.

Moisture is removed from hydrogen generated by the hydrogen production device 4 through a gas-liquid separator or the like for moisture management before the hydrogen is supplied to the hydrogenation device 5 (later-described). Although concrete configuration of the gas-liquid separator is not particularly limited, for example, a gas-liquid separation by cooling, a hydrogen separation film, or the like can be applied, and particularly, a hydrogen separation film is preferably used. Incidentally, the removed moisture circulates in the hydrogen production device 4 and is subjected to electrolysis.

The hydrogen after removing moisture is supplied to the hydrogenation device 5 which is connected by a gas pipe. Incidentally, although the hydrogen after removing moisture may be directly supplied to the hydrogenation device 5, the hydrogen is temporarily stored in hydrogen storing means (not shown in FIG. 1), for example a high pressure tank, in the first embodiment shown in FIG. 1. By this arrangement, in a case that the unsaturated hydrocarbon tank 8 has run out of unsaturated hydrocarbon, or that the saturated hydrocarbon tank 7 cannot accommodate any more saturated hydrocarbon, the renewable energy 1 can be stored without being lost. In other words, the renewable energy 1 can be stored without a waste.

Although concrete configuration of the hydrogen storing means is not limited, for example, a known hydrogen cylinder, a pressure container for high pressure gas, or the like can be used. A single kind out of these may be used, or two or more kinds may be used in arbitrary combination. As a material for the hydrogen storing means, for example, a steel plate, plastic reinforced by carbon fibers, and the like can be used, wherein it is particularly preferred that a pressure tight case, which is pressure resistant against a pressure higher than or equal to a pressure applied to the hydrogen production device 4, is used.

Further, it is also possible to use a hydrogen absorbing alloy for the hydrogen storing means. The hydrogen absorbing alloy used herein can be, for example, a rare-earth metal nickel AB5 alloy, an alloy having a body-centered cubic (BCC) structure of a titanium system, chrome system, or the like. By making such a hydrogen absorbing alloy present in the above-described container or the like, the hydrogen storage amount can be increased. Further, in a case of storing hydrogen in the same volume, the pressure in the hydrogen storing means may be decreased.

The hydrogen production device 4 and the hydrogenation device 5 are connected preferably by a gas pipe (pipe line). However, it is not always necessary that these are connected by a gas pipe. For example, using a high pressure tank or the like, produced hydrogen may be transported to the hydrogenation device 5 (in other words, supplied to the hydrogenation device 5).

The hydrogenation device 5 adds hydrogen produced by the hydrogen production device 4 to unsaturated hydrocarbon. The hydrogenation device 5 is not only connected, as described above, with the hydrogen production device 4 by a gas pipe, but also connected with the saturated hydrocarbon tank 7 and the unsaturated hydrocarbon tank 8 (both will be described later) by liquid pipes. Accordingly, unsaturated hydrocarbon is supplied from the unsaturated hydrocarbon tank 8 to the hydrogenation device 5. Incidentally, the later-described control device 6 is provided between the hydrogenation device 5 and the unsaturated hydrocarbon tank 8.

Although the concrete kind of the unsaturated hydrocarbon used by the hydrogenation device 5 is not particularly limited, for example, an aromatic compound, methylbenzene for example, that is liquid at a room temperature can be suitably used. For example, in a case of using methylbenzene as unsaturated hydrocarbon, obtained saturated hydrocarbon is methylcyclohexane, and the physical amount of hydrogen molecules that can be stored per mole of methylbenzene is 2.5 moles. However, depending on the conditions at the time of addition reaction, for example, anthracene, phenanthrene, or the like may become liquid. Accordingly, in a case of performing addition reaction on such conditions, these aromatic compounds may be used. By using these aromatic compounds, hydrogen in an even larger amount can be stored.

Such an aromatic compound is liquid at a room temperature, and is accordingly advantageous effect in easy storage and a large reaction interface in carrying out hydrogenation reaction. Further, by using an aromatic compound, the physical amount of hydrogen that can be added to a molecule of the aromatic compound can be increased so that more hydrogen can be stored with a smaller amount of unsaturated hydrocarbon. Incidentally, the aromatic compound may be used in one kind, or may be used in two or more kinds in an arbitrary ratio and combination.

A concrete method of adding hydrogen to unsaturated hydrocarbon in the hydrogenation device 5 is not particularly limited. However, from a point of view of a low cost and a short reaction time, hydrogen is usually added to unsaturated hydrocarbon, using a catalyst. Such catalysts includes, for example, metals of Ni, Pd, Pt, Rh, Ir, Re, Ru, Mo, W, V, Os, Cr, Co, Fe, and the like, and alloys of these. Metal or alloy of metals for a catalyst may be in one kind alone, and may be in two or more kinds in an arbitrary ratio and combination.

Further, these catalysts are preferably formed in fine particles from a point of view of further reducing the cost and increasing the reaction surface area. In a case of using a catalyst in fine particles, from a point of view of preventing a decrease in the surface area due to aggregation of the fine particle catalyst, the catalyst may be supported by an arbitrary carrier. In a case of supporting the catalyst by a carrier, a method of supporting is not particularly limited, and for example, a coprecipitation method, a pyrolysis method, an electroless plating method, or the like can be applied. Further, the kind of the carrier is not particularly limited, and it is possible to use, for example, carbon materials such as activated carbon, carbon nanotube, graphite, and the like, and also silica, aluminum, aluminosilicate such as zeolite, and the like. The carrier may be in one kind, and may be in two or more kinds with an arbitrary ratio and combination.

The conditions of the hydrogenation reaction on the unsaturated hydrocarbon by the hydrogenation device 5 are not particularly limited, and arbitrary settings can be made. For example, regarding the reaction temperature, it is possible to add hydrogen at a room temperature (approximately 25 degrees centigrade), however, in a point of view of shortening the reaction time, the addition is preferably performed at a temperature in a rage from 200 to 400 degrees centigrade.

Further, although the reaction pressure at the time of addition reaction is not particularly limited, in a point of view of increasing the efficiency of the addition reaction and shortening the reaction time, the pressure at the time of hydrogenation is preferably set to be within a range of gauge pressure from 1 atm to 50 atm (in other words, from 1 MPa to 5 MPa). Accordingly, in order to increase the pressure at the time of hydrogenation, though not shown in FIG. 1, hydrogen pressure control means, a pressure regulator for example, is provided between the hydrogen production device 4 and the hydrogenation device 5. By providing such hydrogen pressure control means, the generated hydrogen pressure can be appropriately controlled.

As has been described above, hydrogen can be added to unsaturated hydrocarbon, and saturated hydrocarbon can be obtained. The obtained saturated hydrocarbon (so-called organic hydride) is stored in the later-described saturated hydrocarbon tank 7.

The control device 6 is a flow rate control mechanism for controlling the supply amount of unsaturated hydrocarbon stored in the unsaturated hydrocarbon tank 8 to the hydrogenation device 5. As described above, the control device 6 is provided between the hydrogenation device 5 and the unsaturated hydrocarbon tank 8, and connected with the hydrogenation device 5 and the unsaturated hydrocarbon tank 8 by liquid pipes. Further, the control device 6 is connected with the later-described computation processing device 11 by an electrical signal line to supply and receive electrical signals.

The control device 6 is provided with an interface that controls the amount of unsaturated hydrocarbon to be supplied to the hydrogenation device 5 based on a control signal from the computation processing device 11, a central computation processing unit, a valve control unit, and a flow rate adjustment valve. The interface, the central computation processing unit, and the valve control unit are connected with each other by a bus. Incidentally, none of these is shown in FIG. 1.

Based on the control signal from the computation processing device 11, the control device 6 determines a valve control amount stored in a memory inside the central computation processing unit, corresponding to an unsaturated hydrocarbon amount signal. Based on the determined valve control amount, the valve control unit drives the flow rate adjustment valve, and the supply amount of the unsaturated hydrocarbon is controlled by the degree of valve opening/closing.

The saturated hydrocarbon tank 7 accommodates saturated hydrocarbon generated by the hydrogenation device 5. Accordingly, the saturated hydrocarbon tank 7 is connected with the hydrogenation device 5 by a liquid pipe. Further, for example, a flow rate adjustment valve, a flow meter, and the like for control of the supply amount of saturated hydrocarbon to the saturated hydrocarbon tank 7 may be provided between the saturated hydrocarbon tank 7 and the hydrogenation device 5.

The unsaturated hydrocarbon tank 8 stores unsaturated hydrocarbon to be supplied to the hydrogenation device 5. As described above, the unsaturated hydrocarbon tank 8 is connected with the control device 6 by a liquid pipe.

The signal detection unit 10 is connected with the electrical power generator device 2, the storage battery 3, the hydrogen production device 4, and the later-described computation processing device 11 by electrical signal lines. The signal detection unit 10 is provided with output voltage detecting means, a voltmeter for example, for detecting an output voltage value from the electrical power generator device 2, charge voltage detecting means, a voltmeter for example, for detecting a charge voltage value of the storage battery 3, and electrical current detecting means, a current meter for example, for detecting an electrical current amount supplied to the hydrogen production device 4. None of these is shown in FIG. 1.

Further, in addition to the above, the signal detection unit 10 is also provided with output electrical current detecting means, a current meter for example, for detecting an output electrical current value from the electrical power generator device 2, charge electrical current detecting means, a current meter for example, for detecting a charge electrical current value of the storage battery 3, and voltage detecting means, a voltmeter for example, for detecting a voltage value applied to the hydrogen production device 4. Incidentally, none of these is shown in FIG. 1.

The signal detection unit 10 detects at least the above-described output voltage value, the above-described charge voltage value, and the above-described electrical current amount. Further, the later-described computation processing device 11 estimates (computes) a hydrogen amount produced by the hydrogen production device 4, based on these detected values, and the control device 6 controls the amount of unsaturated hydrocarbon to be supplied to the hydrogenation device 5, based on the estimated hydrogen amount. By such an arrangement, the supply amount of unsaturated hydrocarbon can be determined in synchronization, and the efficiency of adding hydrogen to unsaturated hydrocarbon can be improved.

The computation processing device 11 estimates the amount of hydrogen produced by the hydrogen production device 4, based on various values transmitted as described above from the signal detection unit 10. The computation processing device 11 is connected with the signal detection unit 10 and the control device 6 by electrical signal lines. The computation processing device 11 is provided with an interface for receiving signals transmitted from the signal detection unit 10, a central computation processing unit, and an interface for transmitting signals to the control device 6. Incidentally, none of these is shown in FIG. 1.

The computation processing device 11 estimates a hydrogenation reaction for realizing an appropriate adding efficiency corresponding to the supply amount of hydrogen, according to signal amounts detected by the signal detection unit 10 and based on a control program stored in a memory. Then, the computation processing device 11 transmits, to the control device 6, a control signal for control of the supply amount of unsaturated hydrocarbon. Then, based on the transmitted control signal (namely the estimated amount of hydrogen), the control device 6 controls the amount of unsaturated hydrocarbon to be supplied to the hydrogenation device 5.

<Operation>

As has been described above, the renewable energy storage system 100 according to the first embodiment has the above-described configuration. In the following, the operation of the respective means in storing the renewable energy 1 by the renewable energy storage system 100 will be described, referring to FIG. 1.

First, the electrical power generator device 2 (for example, a photovoltaic battery, etc.) generates electrical power, using the renewable energy 1, solar light for example. The generated electrical power is used to charge the storage battery 3 until the storage battery 3 is fully charged. When the storage battery 3 is fully charged, the electrical power is supplied to the hydrogen production device 4 by a control circuit, not shown.

When the electrical power is supplied to the hydrogen production device 4, electrolysis of water is started, and hydrogen is generated. However, it is possible that electrolysis cannot be performed only by the electric power from the electrical power generator device 2. In such a case, electrical power from the storage battery 3 may also be used in parallel, or electrical power only from the storage battery 3 may be used instead of using electrical power from the electrical power generator device 2. For example, as sufficient sunshine can be ensured during a sunny daytime, a sufficient amount of electrical power is charged to the storage battery 3, and further the hydrogenation device 5 is driven by a surplus electrical power. On the other hand, as photovoltaic power generation cannot be performed during nighttime, the hydrogenation device 5 is operated, using electrical power charged to the storage battery 3 during daytime. In such a manner, the renewable energy 1 can be used without a waste.

Hydrogen produced by the hydrogen production device 4 is supplied to the hydrogenation device 5. This hydrogen is added to unsaturated hydrocarbon supplied from the unsaturated hydrocarbon tank 8 connected through the control device 6. Incidentally, the amount of unsaturated hydrocarbon to be supplied to the hydrogenation device 5 is as described above controlled by an output voltage value from the electrical power generator device 2, a charge voltage value of the storage battery 3, and an electrical current amount supplied to the hydrogen production device 4.

Saturated hydrocarbon produced by adding hydrogen is accommodated in the saturated hydrocarbon tank 7 as described above. Then, the saturated hydrocarbon accommodated in the saturated hydrocarbon tank 7 is shipped out unchanged from a liquid state in which the above-described generated hydrogen is added. After shipment, hydrogen is desorbed from the saturated hydrocarbon, and the desorbed hydrogen is used as a fuel or the like. Incidentally, unsaturated hydrocarbon produced by desorbing hydrogen is again stored in the unsaturated hydrocarbon tank 8.

The environment in which the series of these operations is performed is not particularly limited, and arbitrary environment is allowed as long as the above-described problems can be solved. Further, it is not always necessary to arrange all the means at the same place, and arbitrary arrangement is possible, for example, arranging the hydrogen production device 4 indoor and arranging the hydrogenation device 5 outdoor. Accordingly, an operation temperature, at which the series of these operations is performed, is desirably set in a range from minus 50 to plus 400 degrees centigrade, taking into account that hydrogenation reaction in the hydrogenation device 5 is preferably performed at a high temperature.

<Control of Unsaturated Hydrocarbon Amount to be Supplied to Hydrogenation Device 5>

Figure 7:
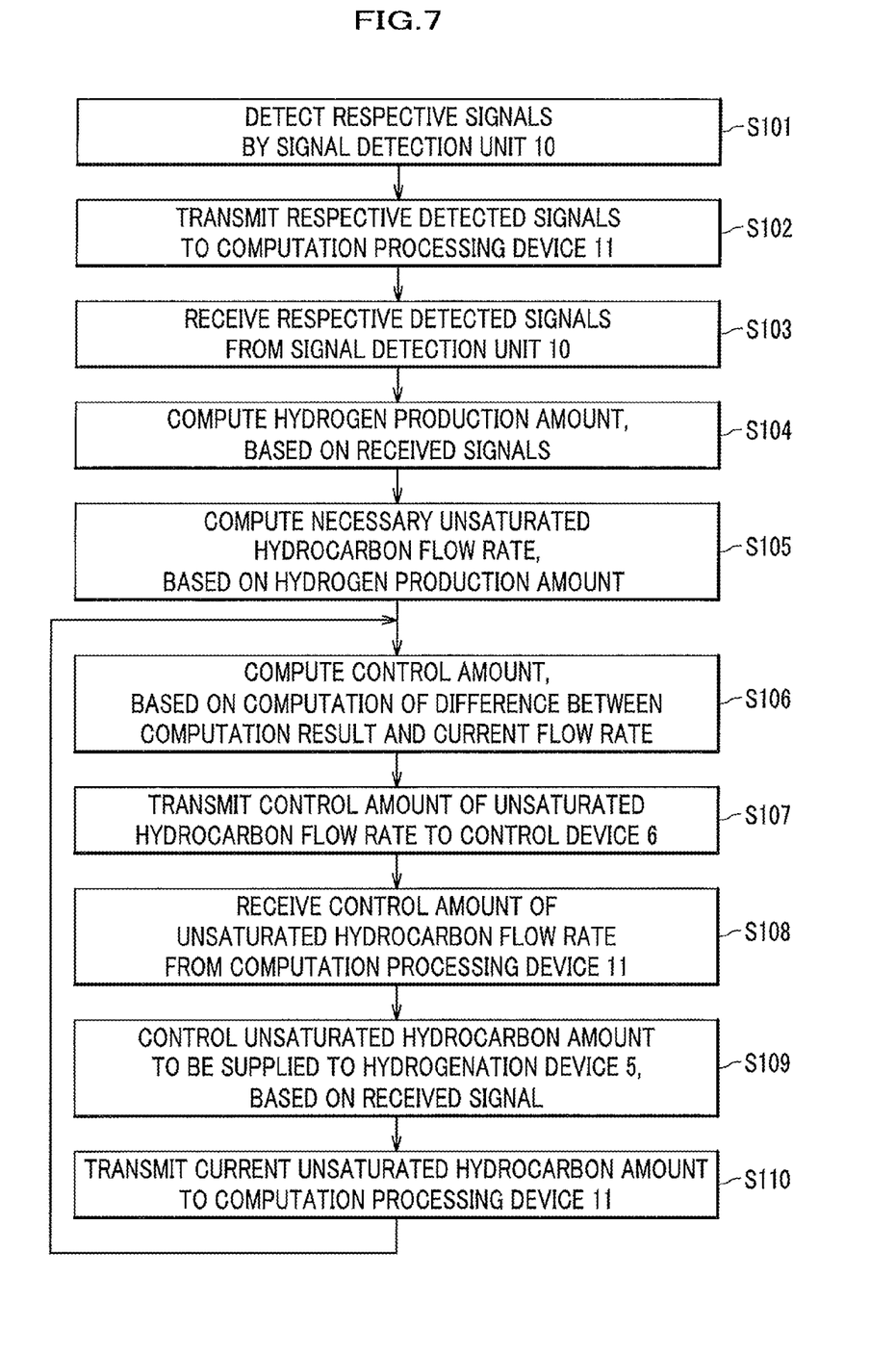
FIG. 7 shows the control flow of an amount of unsaturated hydrocarbon in the renewable energy storage system according to the first embodiment of the invention.

In the following, referring to FIG. 7, control of the amount of unsaturated hydrocarbon to be supplied to the hydrogenation device 5 will be described. FIG. 7 shows the control flow of the amount of unsaturated hydrocarbon in the renewable energy storage system according to the first embodiment of the invention.

As shown in FIG. 7, first, the signal detection unit 10 detects respective signals of the output voltage value of the electrical power generator device 2, the charge voltage amount of the storage battery 3, and the electrical current amount supplied to the hydrogen production device 4 (step S101). Then, the signal detection unit 10 transmits the respective detected signals to the computation processing device 11 (step S102).

The computation processing device 11 receives the respective signals transmitted from the signal detection unit 10 (step S103), and computes the amount of hydrogen produced (hydrogen production amount) by the hydrogen production device 4 (step S104).

An example of a computation method in step S104 will be described below. The electrical current amount supplied to the hydrogen production device 4 is equivalent to the charge amount per unit time supplied to the hydrogen production device 4. Herein, as hydrogen gas is produced by binding between electrical charges supplied to the hydrogen production device 4 and hydrogen ions inside the hydrogen production device 4, it is possible to compute the hydrogen amount produced by the hydrogen production device 4 from the electrical current amount of the hydrogen production device 4.

On the other hand, in a practical system, plural hydrogen production devices 4 are connected and driven wherein the number of hydrogen production devices to be driven is changed based on the input voltage of the hydrogen production device 4. In this case, by obtaining the electrical current amounts of the respective hydrogen production devices 4, it is possible to compute the hydrogen amounts produced by the hydrogen production devices 4. Herein, the electrical current amounts of the respective hydrogen production devices 4 can be obtained by determination of the output voltage value of the hydrogen production devices 4, the charge voltage value of the storage battery 3, and the electrical current amounts of the respective hydrogen production devices 4. For example, in a case that a hydrogen production device 4 is a water electrolysis device, an electrolysis voltage value is theoretically computed, which is determined by conditions of internal configuration of the hydrogen production device 4. The number of hydrogen production devices 4 to be driven is determined by the input voltage and the electrolysis voltage value of a hydrogen production device. Accordingly, the number of hydrogen production devices 4 to be driven is obtained by detecting the output voltage value of a hydrogen production device 4 and the charge voltage value of the storage battery 3 and obtaining the input voltage value that is actually drawn by the hydrogen production device 4. From the number of hydrogen production devices 4 to be driven and the electrical current amount supplied to a hydrogen production device 4, the electrical current amounts of the respective hydrogen production devices are obtained, and the hydrogen amount produced by the hydrogen production devices 4 can be computed. As described above, the hydrogen amounts produced by the hydrogen production devices 4 can be computed from the output voltage value of a hydrogen production device 4, the charge voltage value of the storage battery 3, and the electrical current amounts of the respective hydrogen production devices 4.

In the present embodiment, although the input voltage value of a hydrogen production device 4 is computed by detecting the output voltage value of the hydrogen production device 4 and the charge voltage value of the storage battery 3, it is also possible, by directly detecting the input voltage value of a hydrogen production device 4, to compute the hydrogen amount produced by the hydrogen production devices 4 from the input voltage value of the hydrogen production device 4 and an electrical current amount supplied to the hydrogen production device 4.

Then, based on the computed hydrogen production amount, the computation processing device 11 computes the amount of unsaturated hydrocarbon, to be supplied to the hydrogenation device 5 and to which produced hydrogen is to be added, in other words, the unsaturated hydrocarbon flow rate through the control device 6 (step S105).

Thereafter, the computation processing device 11 computes the deviation between the flow rate of unsaturated hydrocarbon flowing through the control device 6 before flow rate control, the flow rate having been transmitted to the computation processing device 11 in step S110, and the flow rate of unsaturated hydrocarbon computed in step S105, and computes a control amount of the flow rate of unsaturated hydrocarbon (step S106). Incidentally, step S110 is not yet executed when control starts, and in such a case, the computation processing device 11 detects the flow rate of unsaturated hydrocarbon through the control device 6. Then, the control amount computed in step S106 is transmitted to the control device 6 (step S107).

The control device 6 receives the control amount transmitted from the computation processing device 11 (step S108). Then, the control device 6 controls the amount of unsaturated hydrocarbon to be supplied to the hydrogenation device 5, by controlling the flow rate of unsaturated hydrocarbon flowing through the control device 6 based on the received control amount (received signal) (step S109). After the control in step S109, the amount of unsaturated hydrocarbon to be supplied to the hydrogenation device 5 (in other words, the flow rate of unsaturated hydrocarbon flowing through the control device 6) is transmitted to the computation processing device 11 at certain intervals (step S110).

By repeating execution of steps S101 to S110 in such a manner, the amount of unsaturated hydrocarbon to be supplied to the hydrogenation device 5 is controlled based on the output voltage value of the electrical power generator device 2, the charge voltage value of the storage battery 3, and the electrical current amount supplied to the hydrogen production device 4.

<Conclusion>

As has been described above, by the renewable energy storage system 100 according to the first embodiment, as it is possible to respond variation in the supply amount of the renewable energy 1 and improve the efficiency of adding hydrogen to unsaturated hydrocarbon, the renewable energy 1 can be stored without a waste. As the stored renewable energy 1 is converted into hydrogen and is stably stored as a compound containing this hydrogen, the renewable energy 1 can be freely used at any time, as necessary.

2. Second Embodiment

In the following, referring to FIG. 2, a renewable energy storage system 200 according to a second embodiment will be described. Incidentally, elements with the same symbols in FIG. 2 as those in FIG. 1 represent the same elements, and detailed description will be omitted.

In the renewable energy storage system 200, the storage battery 3 and the hydrogen production device 4 shown in FIG. 1 is configured as a single means. That is, instead of the storage battery 3 and the hydrogen production device 4 of the renewable energy storage system 100, there is provided an energy-storage-function added hydrogen production device 9 as energy-storage-function added hydrogen producing means in which a hydrogen production device 4 also has a function as a storage battery 3.

As described above, in the energy-storage-function added hydrogen production device 9, the hydrogen production device 4 also has a function as a storage battery 3. Concretely, in the energy-storage-function added hydrogen production device 9, when the electric power amount stored in a storage battery becomes larger than or equal to a predetermined amount (for example, when the storage battery becomes fully charged), if electrical power is further supplied from the electrical power generator device 2, electrolysis of electrolyte solution (water) is caused. Such an energy-storage-function added hydrogen production device 9 can be for example a lead storage battery or the like. Accordingly, in a case that an electrical power originated from the renewable energy 1 is increasingly stored, then the energy storage capacity becomes a rated value, and a surplus power is thereafter further input, it is possible to obtain hydrogen without wasting the renewable energy 1, and the hydrogen is supplied to the hydrogenation device 5 through a built-in hydrogen line. Further, as it is unnecessary to separately provide a storage battery and a hydrogen production device, space saving can be attained for a renewable energy storage system.

Incidentally, the energy-storage-function added hydrogen production device 9 may be a single device or two or more devices may be arbitrarily connected. The energy-storage-function added hydrogen production device 9 and the hydrogen production device 4 may be used in parallel. Particularly, in a case that two or more energy-storage-function added hydrogen production devices are connected to configure an energy-storage-function added hydrogen production device 9, for example, corresponding to the power supply amount from an electrical power generator device 2, the number of energy-storage-function added hydrogen production devices may be changed. That is, arrangement may be made such that, in a case that a large amount of electrical power is supplied, the electrical power is supplied to a large number of energystorage-function added hydrogen production devices; in a case that a small amount of electrical power is supplied, the electrical power is supplied to a small number of energy-storage-function added hydrogen production devices; energy storage is performed; and hydrogen is produced (generated). By such an arrangement, the renewable energy 1 can be stored without a waste.

Further, as the energy-storage-function added hydrogen production device 9 also has an energy storage function as described above, when sunshine cannot be ensured, on a rainy day or during nighttime for example, hydrogen may be produced, using electrical power stored in the energy-storage-function added hydrogen production device 9. Further, electrical power may be supplied from the storage battery 3 to the energy-storage-function added hydrogen production device 9, using the energy-storage-function added hydrogen production device 9 and the storage battery 3 in parallel.

Still further, the amount of unsaturated hydrocarbon to be supplied to the hydrogenation device 5 can be controlled similarly to the case of the above-described first embodiment. Concretely, in the above-described first embodiment, the amount of unsaturated hydrocarbon to be supplied to the hydrogenation device 5 is controlled, based on the output voltage value of the electrical power generator device 2, the charge voltage value of the storage battery 3, and the electrical current amount supplied to the hydrogen production device 4. On the other hand, likewise also in the second embodiment, the amount of unsaturated hydrocarbon to be supplied to the hydrogenation device 5 can be controlled, based on the output voltage value of the electrical power generator device 2, and the charge voltage value and the supplied electrical current value of the energy-storage-function added hydrogen production device 9.

Figure 8:
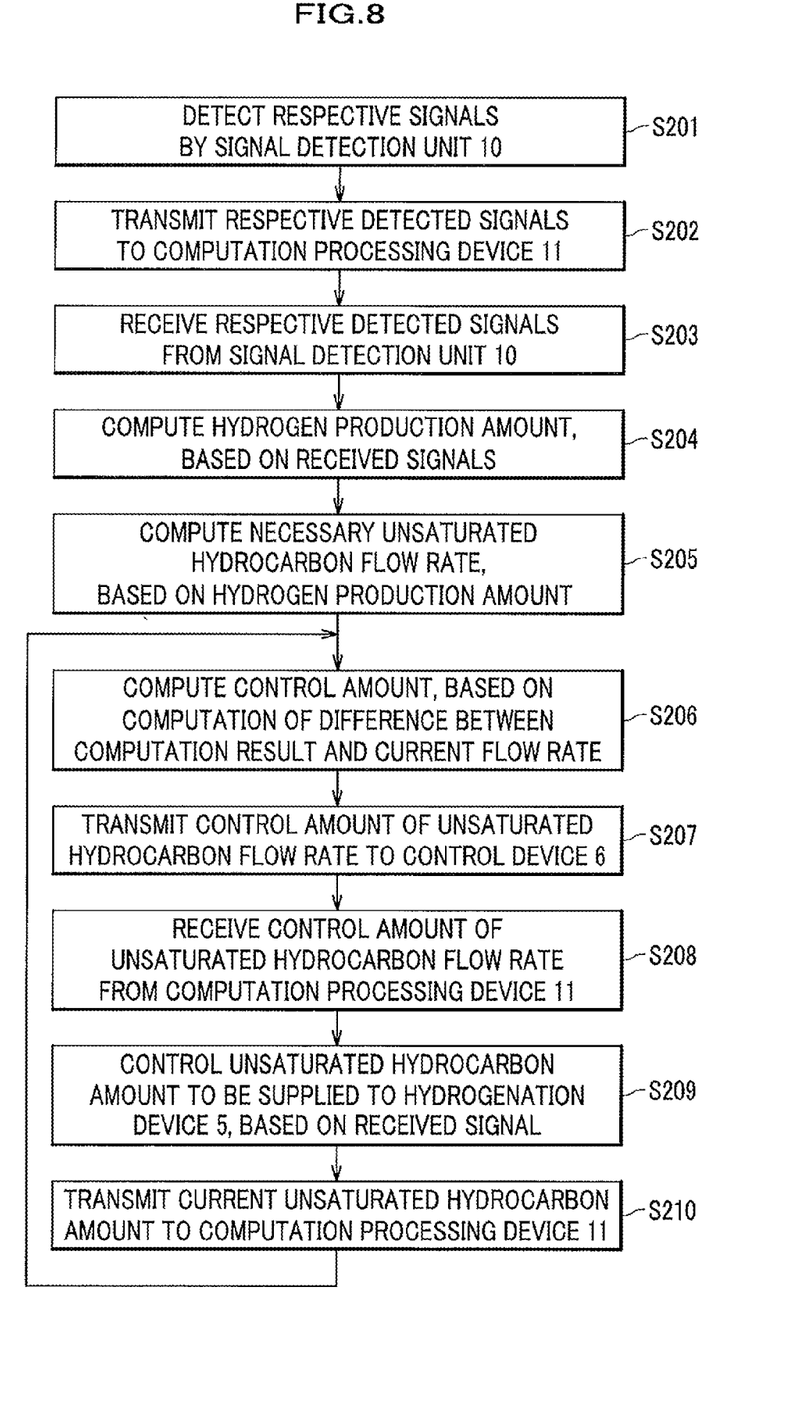
FIG. 8 shows the control flow of the amount of unsaturated hydrocarbon in the renewable energy storage system according to the second embodiment of the invention.

FIG. 8 shows the control flow of the amount of unsaturated hydrocarbon in the renewable energy storage system 200 according to the second embodiment of the invention. The 'respective signals' in step S201 represent the output voltage value of the electrical power generator device 2, and the charge voltage value and the supplied electrical current value of the energy-storage-function added hydrogen production device 9. Steps S201 to S210 are respectively the same steps as the above-described steps S101 to S110, and accordingly, the description of these will be omitted.

In such a manner, the renewable energy storage system 200 in the second embodiment can also control the amount of unsaturated hydrocarbon to be supplied to the hydrogenation device 5.

3. Third Embodiment

In the following, referring to FIG. 3, a renewable energy storage system 300 according to a third embodiment will be described. Incidentally, elements with the same symbols in FIG. 3 as those in FIG. 2 represent the same elements, and detailed description will be omitted.

Figure 2:
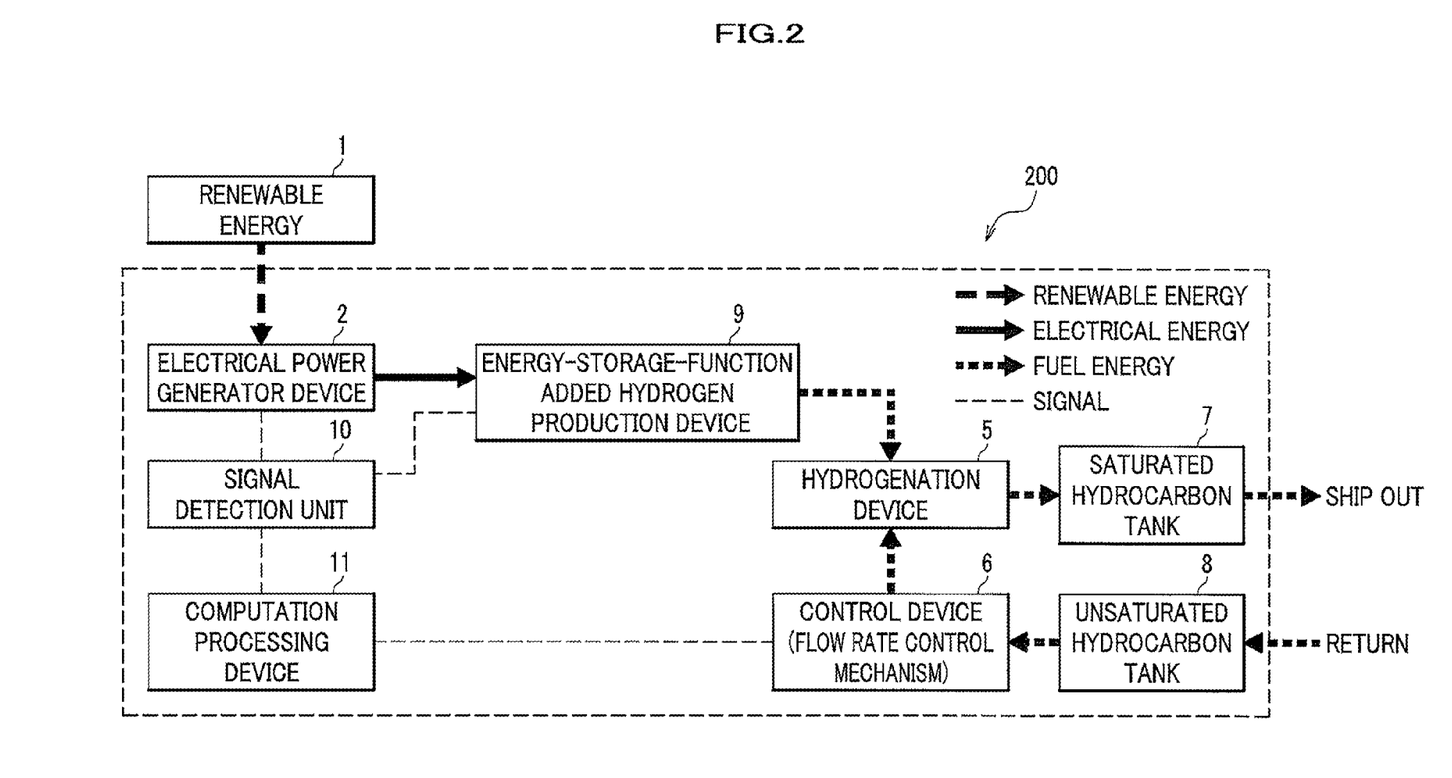
FIG. 2 schematically shows a configuration of a renewable energy storage system according to a second embodiment of the invention.
Figure 3:
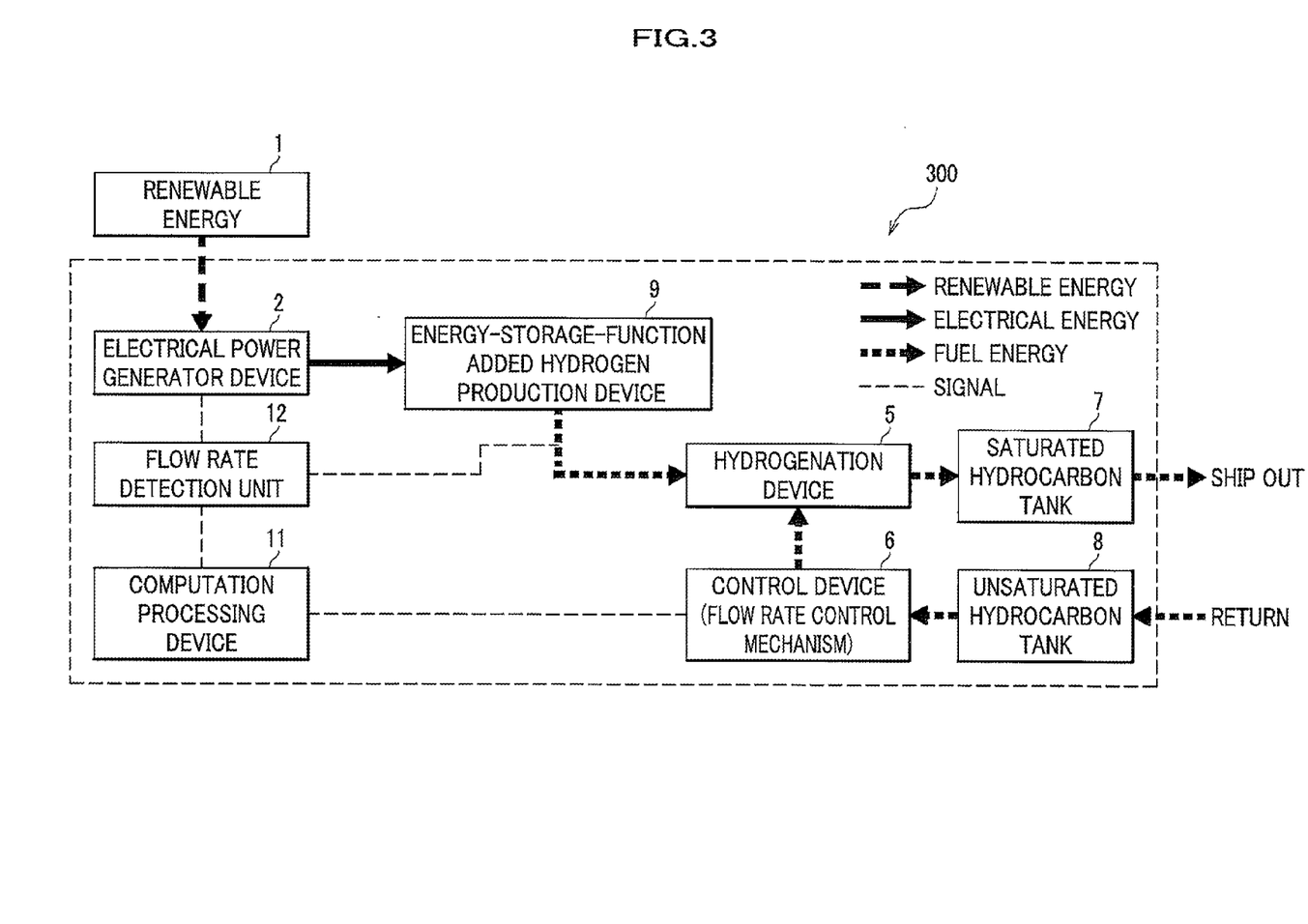
FIG. 3 schematically shows a configuration of a renewable energy storage system according to a third embodiment of the invention.

The renewable energy storage system 300 shown in FIG. 3 is configured by arranging, on the renewable energy storage system 200 shown in FIG. 2, a flow rate detection unit 12 as hydrogen amount detecting means for detecting the hydrogen amount produced by the energy-storage-function added hydrogen production device 9. Based on the hydrogen amount detected by the flow rate detection unit 12, a computation processing device 11 can determine the amount of unsaturated hydrocarbon to be supplied to the hydrogenation device 5. That is, based on the hydrogen amount detected by the flow rate detection unit 12, the control device 6 controls the amount of unsaturated hydrocarbon to be supplied to the hydrogenation device 5. Also by such an arrangement, the supply amount of unsaturated hydrocarbon can be determined in synchronization, and the adding efficiency of hydrogen to unsaturated hydrocarbon can be improved.

It is not always necessary to provide the flow rate detection unit 12 between the energy-storage-function added hydrogen production device 9 and the hydrogenation device 5, and the flow rate detection unit 12 may be provided, for example, inside the energy-storage-function added hydrogen production device 9.

Further, the amount of unsaturated hydrocarbon to be supplied to the hydrogenation device 5 can also be controlled similarly to the cases of the first embodiment and the second embodiment. A control flow of the amount of unsaturated hydrocarbon to be supplied to the hydrogenation device 5 in the renewable energy storage system 300 according to the third embodiment will be concretely described below, referring to FIG. 9.

Figure 9:
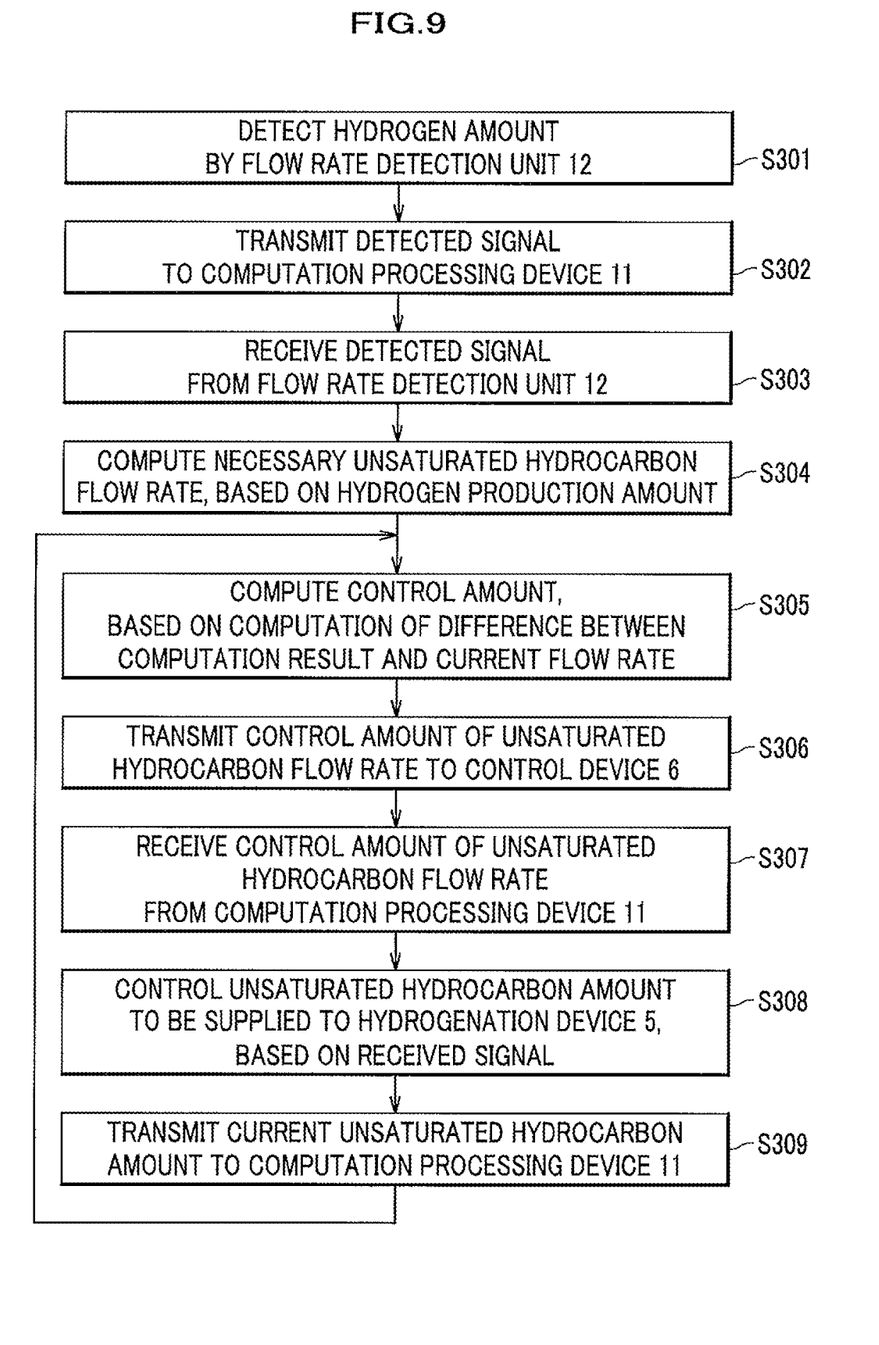
FIG. 9 shows the control flow of the amount of unsaturated hydrocarbon in the renewable energy storage system according to the third embodiment of the invention.

As shown in FIG. 9, first, the flow rate detection unit 12 detects a hydrogen amount produced by the energy-storage-function added hydrogen production device 9 (step S301). Then, the flow rate detection unit 12 transmits the detected hydrogen amount to the computation processing device 11 as a detected signal (step S302).

Then, the computation processing device 11 receives the detected signal transmitted from the flow rate detection unit 12 (step S303), and similarly to the first embodiment, can control the amount of unsaturated hydrocarbon to be supplied to the hydrogenation device 5, based on the received amount of hydrogen production. Accordingly, as steps S304 to S309 are the same as the above-described steps S105 to S110, description will be omitted.

In such a manner, the renewable energy storage system 300 in the third embodiment also can control the amount of unsaturated hydrocarbon to be supplied to the hydrogenation device 5.

4. Fourth Embodiment

In the following, referring to FIG. 4, a renewable energy storage system 400 in a fourth embodiment will be described. Incidentally, elements with the same symbols in FIG. 4 as those in FIG. 1 represent the same elements, and detailed description will be omitted.

Figure 4:
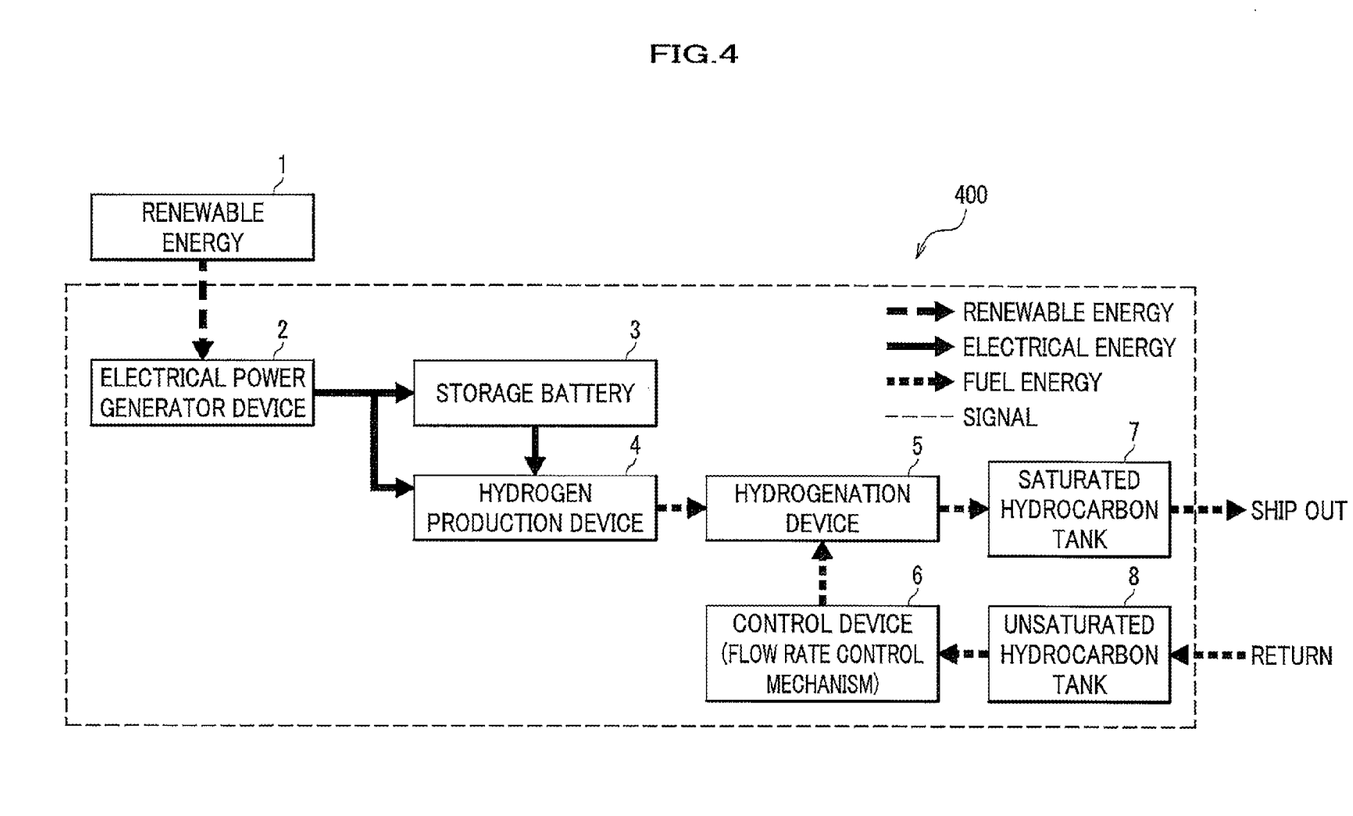
FIG. 4 schematically shows a configuration of a renewable energy storage system according to a fourth embodiment of the invention.

The renewable energy storage system 400 shown in FIG. 4 is configured by omitting the signal detection unit 10 and the computation processing device 11 from the renewable energy storage system 100 shown in FIG. 1. Also with such a configuration of a renewable energy storage system, the problems to be solved by the invention can be solved. Further, as the signal detection unit 10 and the computation processing device 11 are omitted, there are advantages including that the installation cost can be reduced and it is unnecessary to perform complicated control.

5. Fifth Embodiment

In the following, referring to FIG. 5, a renewable energy storage system 500 in a fifth embodiment will be described. Incidentally, elements with the same symbols in FIG. 5 as those in FIG. 2 represent the same elements, and detailed description will be omitted.

Figure 5:
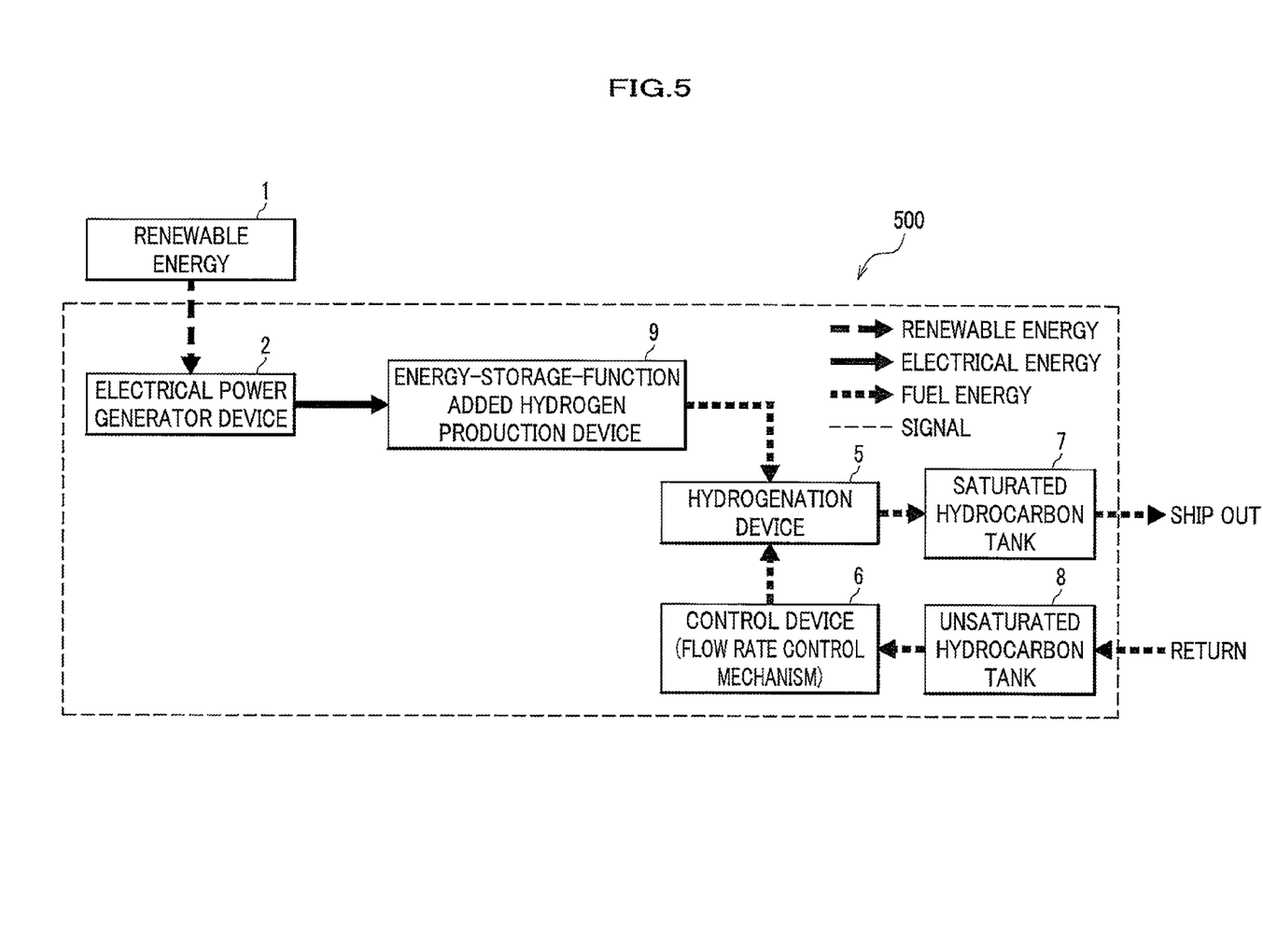
FIG. 5 schematically shows a configuration of a renewable energy storage system according to a fifth embodiment of the invention.

The renewable energy storage system 500 shown in FIG. 5 is configured by omitting the signal detection unit 10, the computation processing device 11, and the like from the renewable energy storage system 200 shown in FIG. 2. Also with such a configuration of a renewable energy storage system, the problems to be solved by the invention can be solved. Further, as the signal detection unit 10 and the computation processing device 11 are omitted, there are advantages including that the installation cost can be reduced and it is unnecessary to perform complicated control. Further, as it is unnecessary to separately provide a storage battery and a hydrogen production device, there is also an advantage that space saving can be attained for a renewable energy storage system.

6. Sixth Embodiment

In the following, referring to FIG. 6, a renewable energy storage system 600 in a sixth embodiment will be described. Incidentally, elements with the same symbols in FIG. 5 as those in FIG. 1 represent the same elements, and detailed description will be omitted.

Figure 6:
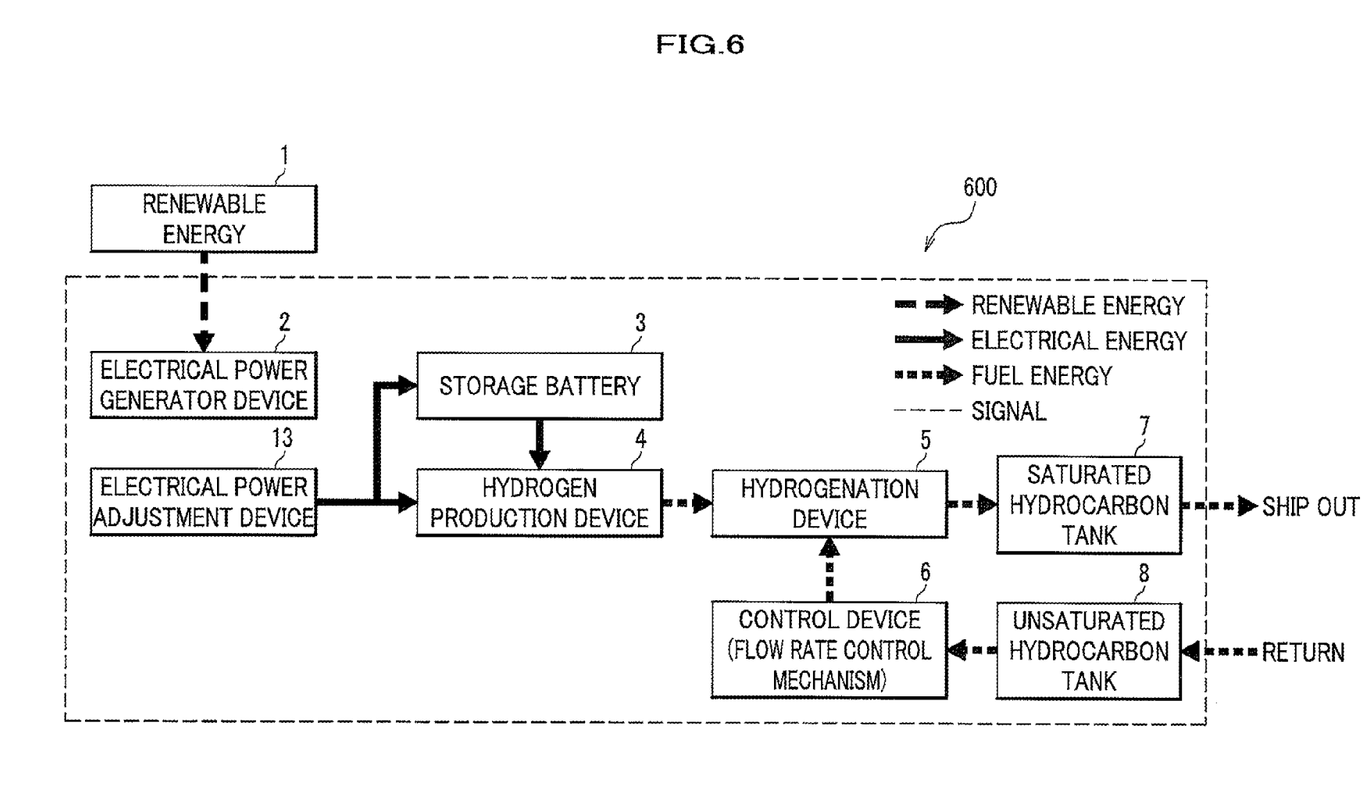
FIG. 6 schematically shows a configuration of a renewable energy storage system according to a sixth embodiment of the invention.

The renewable energy storage system 600 shown in FIG. 6 is configured by omitting the signal detection unit 10, the computation processing device 11, and the like from the renewable energy storage system 600 shown in FIG. 1, and providing an electrical power adjustment device 13 between the electrical power generator device 2, and the storage battery 3 and the hydrogen production device 4. Incidentally, although the renewable energy storage system 600 uses the storage battery 3 and the hydrogen production device 4, the above-described energy-storage-function added hydrogen production device 9 may be used instead of these.

Depending on the kind of a renewable energy 1, obtained electrical power can be either direct current or alternate current. For example, DC power is obtained by photovoltaic power generation, and AC power is obtained by wind power generation. Further, output variation due to variation in sunshine intensity occurs in photovoltaic power generation, and electrical power that varies accompanying temporal change is generated even as a DC power. In wind power generation, an electrical power generator main body rotates and outputs AC power, accompanying rotation of propellers. As electrical power signals obtained by these electrical power generating means are different, there are cases of providing a DC-DC convertor or the like for photovoltaic power generation, and there are cases of providing an AC-DC convertor or the like for conversion from AC power into DC power for wind power generation.

In this situation, the renewable energy storage system 600 is provided with the electrical power adjustment device 13 having these functions. Incidentally, the renewable energy storage system 600 may be connected with a grid power through the electrical power adjustment device 13. Also with such a configuration of a renewable energy storage system, the problems to be solved by the present invention can be solved. Further, as the signal detection unit 10 and the computation processing device 11 are omitted, there are advantages including that the installation cost can be reduced and it is unnecessary to perform complicated control. Further, as the electrical power adjustment device 13 is provided, electrical power can be stably supplied, and the renewable energy 1 can be stably stored without an excessive load on the storage battery 3 and the hydrogen production device 4.

7. Others

Incidentally, a flow rate detection unit 12 has been described in relation to the renewable energy storage system 300, and an electrical power adjustment device 13 has been described in relation to the renewable energy storage system 600, however, these can be likewise applied also to other embodiments.

DESCRIPTION OF REFERENCE SYMBOLS 1. renewable energy
2. electrical power generator device
3. storage battery
4. hydrogen production device
5. hydrogenation device
6. control device
7. unsaturated hydrocarbon tank
8. saturated hydrocarbon tank
9. energy-storage-function added hydrogen production device
10. signal detection unit
11. computation processing device
12. flow rate detection unit
13. electrical power adjustment device

The invention claimed is:

1. A renewable energy storage system for storing renewable energy, comprising:
    electrical power generator converting the renewable energy into an electrical power;
    energy storing device storing the electrical power;
    hydrogen producing device producing hydrogen, using the electrical power obtained by the electrical power generator and/or the electrical power stored by the energy storing device;
    hydrogenating device for adding the hydrogen produced by the hydrogen producing device to unsaturated hydrocarbon;
    saturated hydrocarbon storing device for storing saturated hydrocarbon produced by adding the hydrogen to the unsaturated hydrocarbon;
    unsaturated hydrocarbon storing device for storing the unsaturated hydrocarbon;
    unsaturated hydrocarbon supply amount controller for controlling an amount of the unsaturated hydrocarbon that is stored in the unsaturated hydrocarbon storing device and is to be supplied to the hydrogenating device;
    output voltage detector detecting an output voltage value of the electrical power generator;
    charge voltage detector detecting a charge of voltage value of the energy storing device; and
    electrical current detector detecting an electrical current amount supplied to a hydrogen producing detector,
    wherein an amount of hydrogen produced by the hydrogen producing device is estimated based on detected output voltage value, detected charge voltage value, and detected electrical current amount,
    and wherein the supply amount controller controls the amount of the unsaturated hydrocarbon to be supplied to the hydrogenating device based on the estimated amount of hydrogen.

2. The renewable energy storage system according to claim 1,
    wherein the hydrogen producing device having a function as an energy storing device.

3. The renewable energy storage system according to claim 1, comprising:
   hydrogen amount detector detecting an amount of hydrogen produced by the hydrogen producing device,
   wherein the supply amount controller controls the amount of the unsaturated hydrocarbon to be supplied to the hydrogenating device, based on detected amount of hydrogen.

4. The renewable energy storage system according to claim 1, comprising:
   electrical power controller controlling an electrical power output obtained by the electrical power generator,
   wherein the electrical power controller adjusts an electrical power supply amount to the energy storing device and the hydrogen producing device.

5. The renewable energy storage system according to claim 1, comprising:
   hydrogen storing device for storing hydrogen produced by the hydrogen producing device.

6. The renewable energy storage system according to claim 1,
   wherein an operation temperature of the renewable energy storage system is higher than or equal to minus 50 degrees centigrade and lower than or equal to 400 degrees centigrade.

7. The renewable energy storage system according to claim 1, comprising:
   hydrogen pressure controller for controlling a pressure of hydrogen produced by the hydrogen producing device.

8. The renewable energy storage system according to claim 1,
   wherein a pressure during producing hydrogen is higher than or equal to 1 atm and lower than or equal to 50 atm in the hydrogen producing device.

9. The renewable energy storage system according to claim 1,
   wherein a pressure during hydrogenating is higher than or equal to 1 atm and lower than or equal to 50 atm in the hydrogenating device.

* * * * *